(12) United States Patent (10) Patent No.: US 12,378,003 B2
Heick et al. (45) Date of Patent: Aug. 5, 2025

(54) AIRCRAFT SKIN ALIGNMENT SYSTEM AND METHOD WITH EDGE INDEXING

(71) Applicant: Textron Aviation Inc., Wichita, KS (US)

(72) Inventors: Royce Heick, Goddard, KS (US); Aaron Paul Shirley, Wichita, KS (US); Clark Ray Miller, Wichita, KS (US); William Richardson, Conway Springs, KS (US); Jason Short, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/413,903

(22) Filed: Jan. 16, 2024

(65) Prior Publication Data

US 2024/0239517 A1 Jul. 18, 2024

Related U.S. Application Data

(60) Provisional application No. 63/480,265, filed on Jan. 17, 2023.

(51) Int. Cl.
*B64F 5/10* (2017.01)
*B64C 1/12* (2006.01)

(52) U.S. Cl.
CPC . *B64F 5/10* (2017.01); *B64C 1/12* (2013.01)

(58) Field of Classification Search
CPC ...................................... B64F 5/10; B64C 1/12
USPC ............................... 16/95 W, 87.4; D12/192
See application file for complete search history.

(56) References Cited

U.S. PATENT DOCUMENTS

| | | | | | |
|---|---|---|---|---|---|
| 3,627,436 | A | * | 12/1971 | Adams | B23Q 16/043 408/63 |
| 5,560,102 | A | * | 10/1996 | Micale | B64C 1/12 29/559 |
| 6,604,895 | B1 | * | 8/2003 | Schroeder | B23C 1/20 409/218 |
| 8,914,979 | B2 | * | 12/2014 | Venskus | B64C 1/068 29/897 |
| 2014/0157588 | A1 | * | 6/2014 | Boyd | B64F 5/10 29/721 |
| 2016/0296994 | A1 | * | 10/2016 | Hanninen | B64C 3/26 |
| 2020/0198753 | A1 | * | 6/2020 | Oberoi | B25J 9/1682 |

* cited by examiner

*Primary Examiner* — Lawrence Averick
(74) *Attorney, Agent, or Firm* — Avek IP, LLC (57) ABSTRACT

An aircraft skin alignment system includes a support structure to support one or more aircraft skins, a puller tool, and a clamp tool; the puller tool having a base, the base supporting a holding mechanism to releasably engage with a first aircraft skin and a pulling mechanism to apply a pulling force to the first aircraft skin when the first aircraft skin is engaged with the holding mechanism; and the clamp tool having a body supporting an edge locator; the puller tool is to pull the first aircraft skin such that a first edge of the aircraft skin abuts the edge locator, the edge locator preventing the first edge from being pulled past the edge locator; and tool holes can be drilled into the first aircraft skin such that the tool holes are aligned based on an edge index due to a position of the edge locator.

9 Claims, 10 Drawing Sheets

AIRCRAFT SKIN ALIGNMENT SYSTEM AND METHOD WITH EDGE INDEXING

CROSS-REFERENCE TO RELATED APPLICATIONS

This application claims the benefit of U.S. Provisional Patent No. 63/480,265 filed on Jan. 17, 2023, the entire contents of which are herein incorporated by reference.

BACKGROUND

1. Field

Embodiments of the disclosure relate to aircraft skin trimming systems, and in particular to an aircraft skin alignment system and method that utilizes edge indexing to reduce a need for aircraft skin trimming during the assembly process.

2. Related Art

Aircraft skin alignment and subsequent skin trimming is known in the art. For example, U.S. Pat. No. 8,914,979 to Venskus et al. describes a system and method for assembling aircraft components using a machine for performing drilling and trimming operations, and a support tool having indexing features that are configured to mate with locating holes on the aircraft components. U.S. Pat. No. 5,560,102 to Micale et al. describes a panel and fuselage assembly process that uses indexing tabs, where devices are used to align holes of skin tabs with pins of an indexing device. U.S. Pat. No. 6,604,895 to Schroeder describes an aircraft panel tab router configured for use in removal of aircraft tabs located on wing elements, skin structures, and other panels.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In some embodiments, the present invention relates to an aircraft skin alignment system, including: at least one support structure configured to support one or more aircraft skins, a puller tool, and a clamp tool; the puller tool having a base, the base supporting a holding mechanism configured to releasably engage with a first aircraft skin and a pulling mechanism configured to apply a pulling force to the first aircraft skin when the first aircraft skin is engaged with the holding mechanism; and the clamp tool having a body supporting an edge locator. The puller tool is configured to pull the first aircraft skin such that a first edge of the aircraft skin abuts the edge locator, the edge locator preventing the first edge from being pulled past the edge locator. One or more tool holes can be drilled into the first aircraft skin such that the one or more tool holes are aligned based on an edge index due to a position of the edge locator.

According to another embodiment, the present invention relates to a method of aligning aircraft skin, including: loading a first aircraft skin onto a support structure; engaging a puller tool with the first aircraft skin; applying a pulling force to the first aircraft skin via the puller tool, wherein the applied pulling force pulls an edge of the first aircraft skin to an edge locator of a clamp tool; and drilling one or more tool holes through the first aircraft skin as the first edge abuts the edge locator. The one or more tool holes are aligned based on an edge index due to a position of the edge locator.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aircraft skin is an outer cover of some components of an aircraft, such as the wings and fuselage. During construction of an aircraft, a plurality of aircraft skins are formed and secured to structural components to create the outer layer of the aircraft. In conventional assembly processes, aircraft skins may require trimming so that all edges are smooth and aligned. This trimming process is labor and time intensive. Further, when skin trimming is accomplished by hand, it may lead to repetitive motion injuries, lacerations, and eye injuries. Accordingly, it is desirous to reduce the amount of aircraft skin trimming required during the assembly process of aircraft components.

Figure 1A:
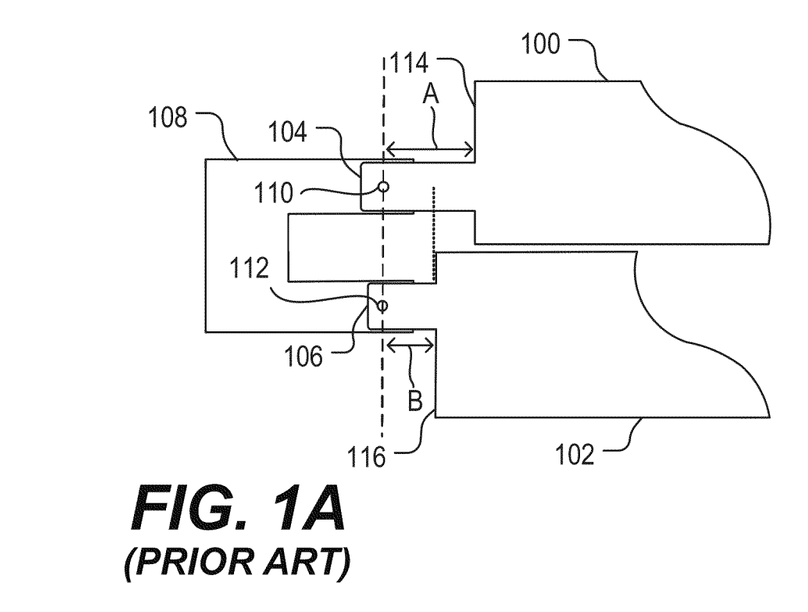
FIG. 1A depicts a simplified diagram of a conventional aircraft skin alignment method.

One conventional method of aligning aircraft skins is depicted in simplified form in FIG. 1A. As shown, a first aircraft skin 100 and a second aircraft skin 102 are aligned via associated first and second tabs 104, 106 and by one or more assembly tools 108. In this conventional method, the one or more assembly tools 108 are configured to align the aircraft skins 100, 102 based on tool holes 110, 112. This may result in the skin edges 114, 116 being unaligned as shown, due to different distances, represented with arrows A and B, between the skin edges 114, 116 and tool holes 110, 112. As such, skin edge 116 would require trimming in order to align with skin edge 114. Again, as discussed above, reducing the need to trim aircraft skin edges would improve efficiencies in the overall construction of aircraft components, and further reduce possible harm to workers.

Figure 1B:
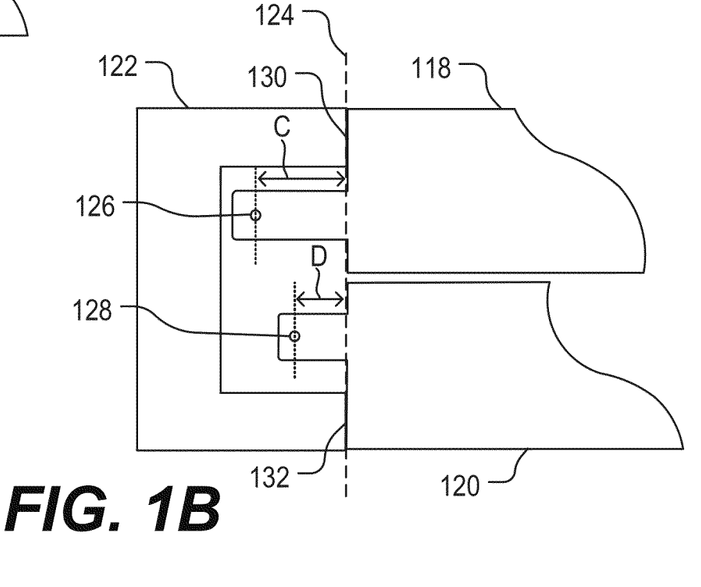
FIG. 1B depicts a simplified diagram of an aircraft skin alignment method using skin edge indexing in accordance with the present invention.

In FIG. 1B, a simplified diagram depicts an aircraft skin alignment system with edge indexing in accordance with embodiments of the present disclosure. As shown, a first aircraft skin 118 and a second aircraft skin 120 are aligned via one or more assembly tools 122 based on an edge index 124. Specifically, the one or more assembly tools 122 provide for pulling the aircraft skins 118, 120 to the edge index 124 such that distances, represented with the arrows C and D, between tool holes 126, 128 and aircraft skin edges 130, 132 are irrelevant. The aircraft skins 118, 120 are aligned at edges 130, 132 such that no trimming, or at least reduced trimming, of the edges 130, 132 would be required. This provides for improved efficiencies in the assembly process of aircraft components requiring skin as well as improved safety considerations.

Figure 2:
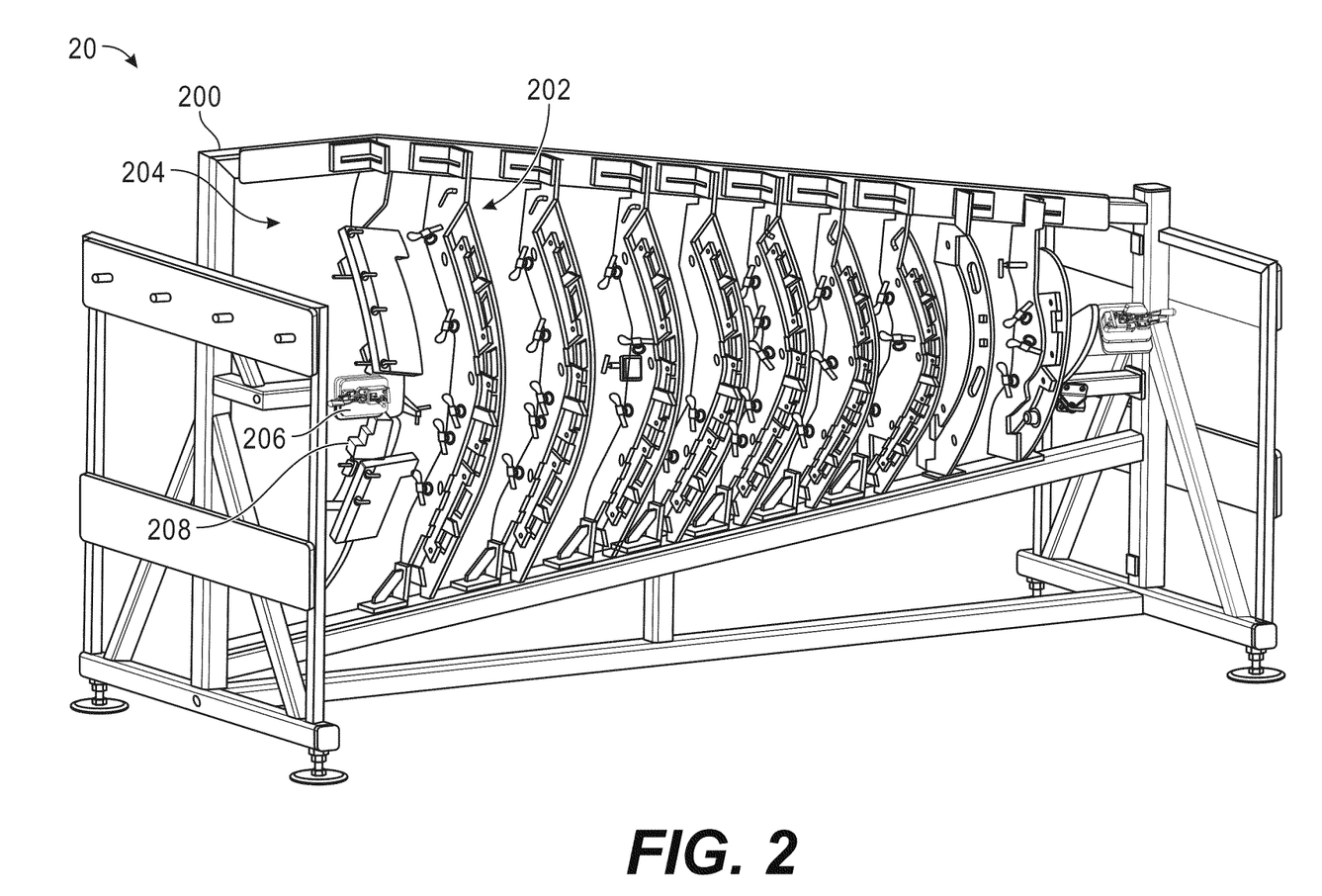
FIG. 2 is a perspective angled view of an embodiment of a support structure with an aircraft skin alignment system of the present invention.

FIG. 2 shows an aircraft skin alignment system 20 in accordance with embodiments of the present disclosure. System 20 may include a support structure 200 which may vary in form as would be understood by those skilled in the art. The support structure 200 provides one or more securement structures 202 for receiving and holding one or more aircraft skins (not shown in FIG. 2). Again, it should be understood by those skilled in the art that the securement structures 202 may vary and include various clamps, braces, or other elements to securely receive and hold the aircraft skins. Further, the support structure 200 may include one or more locations to attach one or more alignment tools 204. In embodiments, the one or more alignment tools 204 comprise at least a puller tool 206 and a clamp tool 208, discussed in detail herein. The one or more alignment tools 204 will function to pull and align the one or more aircraft skins based on an edge index, as discussed in connection with FIG. 1B.

Figure 3:
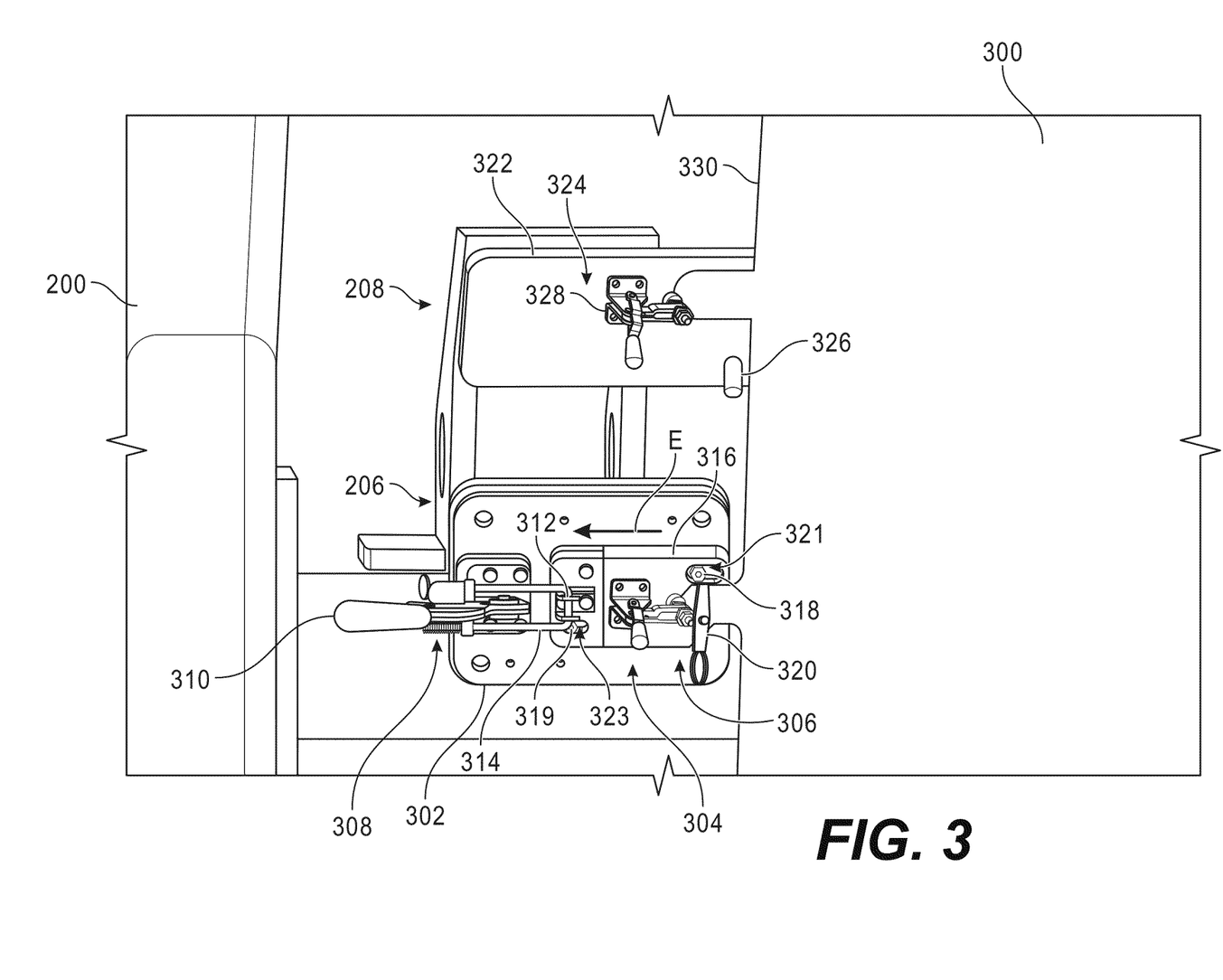
FIG. 3 is a front view of the aircraft skin alignment system of the present invention with an aircraft skin loaded onto the support structure, and before the aircraft skin is pulled to an edge locator.
Figure 4:
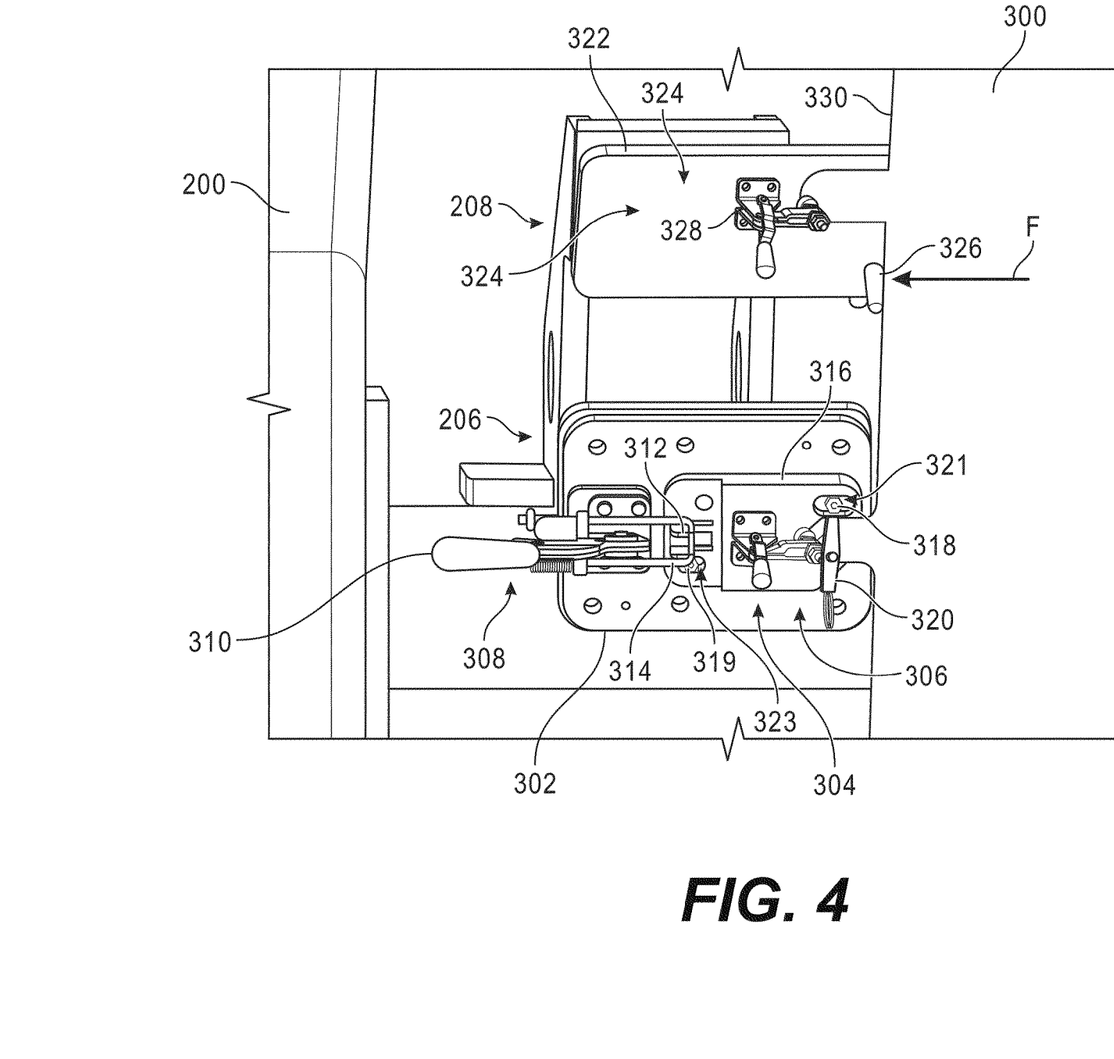
FIG. 4 is a front view of the aircraft skin alignment system of the present invention with the aircraft skin loaded onto the support structure, and after the aircraft skin is pulled to the edge locator.

FIGS. 3 and 4 depict front detailed views of the puller tool 206 and clamp tool 208 in accordance with embodiments. As shown, the puller tool 206 and clamp tool 208 may be rigidly affixed to the support structure 200 such as via bolts, welds, or other securement means. A first aircraft skin 300 is held via the support structure for manipulation via the puller tool 206 and clamp tool 208.

In FIG. 3, the first aircraft skin 300 is shown prior to force being applied via the puller tool 206 as discussed below. The puller tool 206 includes a base 302 with a front surface 304 and a locator system 306 mounted to the front surface 304 of the base 302. The locator system 306 is configured to engage with and releasably attach to the first aircraft skin 300. Further, a puller device 308 is mounted to the front surface 304 of the base 302, the puller device 308 having a spring-loaded handle 310 configured to apply force to the locator system 306 such as via a hook 312 and latch 314, thereby pulling the first aircraft skin 300 in a direction indicated by arrow E. It is contemplated that in alternative embodiments, an alternate means of applying force may be used. In other words, the puller tool 206 includes at least one holding mechanism to engage with and hold the aircraft skin 300 and at least one pulling mechanism to pull or apply force to the aircraft skin 300.

The locator system 306, in embodiments, comprises a mount 316 engaged with the base 302 via one or more bolts 318, 319 extending through one or more channels 321, 323 such that the mount 316 can slide with the applied force from the puller device 308. Specifically, as the spring-loaded handle 310 is actuated, a pulling force is applied to the mount 316 via the hook 312 and latch 314, which in turn causes the mount 316 to slide in the direction indicated with arrow E, and further pull the first aircraft skin 300 also in the direction indicated with arrow E. This is shown best in FIG. 4, wherein the spring-loaded handle 310 has been at least partially actuated to cause pulling on the first aircraft skin 300. The one or more bolts 318, 319 hold the mount 316 in place, while the one or more channels 321, 323 allow for the sliding motion with applied force.

The locator system 306, in embodiments, further comprises a locator pin 320 which provides the means to securely engage with the first aircraft skin 300 via a tool hole (not shown). The locator pin 320 extends through the tool hole and therefore through a thickness of the aircraft skin 300 and into mount 316 to secure the skin thereto. The locator pin 320 may vary in embodiments, such as being a T-pin as shown.

The clamp tool 208, in embodiments, comprises a tool body 322 with a front surface 324 and an edge locator 326 extending from the front surface 324 of the tool body 322. In embodiments, one or more clamps 328 are further secured to the front surface 324 of the tool body 322 and provide for clamping against the aircraft skin 300. In embodiments, the edge locator 326 is a protruding body extending from the front surface 324, thereby providing a physical barrier to an edge 330 of the first aircraft skin 300.

During operation, the puller tool 206 functions to engage with the first aircraft skin 300 and apply pressure in the direction indicated with arrow E to the first aircraft skin 300. This in turn causes the edge 330 of the first aircraft skin 300 to be pulled against the edge locator 326, as shown with arrow F in FIG. 4. The edge locator 326 physically blocks and prevents the edge from moving past the edge locator 326. After the first aircraft skin 300 is pulled to the edge locator 326, one or more new tool holes can be drilled through the first aircraft skin 300, such that the one or more new tool holes can be used in subsequent steps of assembly. Accordingly, this operation uses the edge 330 for alignment and drilling of new tool holes for use in future assembly processes, which will result in one or more aircraft skins all having the same distance from the newly drilled tool holes to their associated skin edges, as demonstrated in FIG. 1B. Additional aircraft skins, or the same first aircraft skin 300, can follow these operational steps, and therefore the system functions to index each aircraft skin edge, which reduces the need for subsequent trimming.

Figure 5:
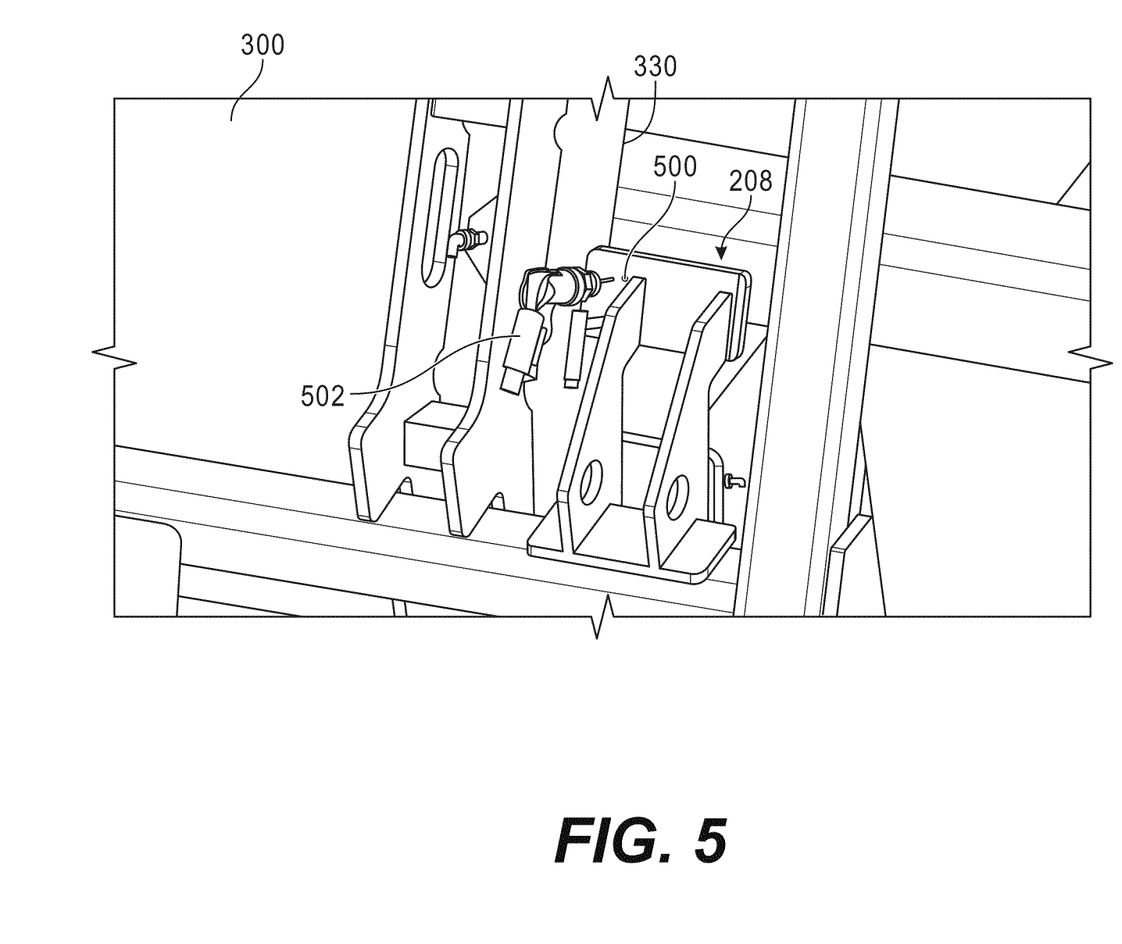
FIG. 5 is a rear angled view showing use of a drill to drill a new tool hole into the aircraft skin after the aircraft skin is pulled to the edge locator using the aircraft skin alignment system.

FIG. 5 depicts a rear view of clamp tool 208. It should be understood that in this figure, the first aircraft skin 300 has been pulled and the edge 330 aligned with the edge locator 326. As discussed, once the first aircraft skin 300 is pulled, a new tool hole 500 can be drilled. In this example, the new tool hole 500 is drilled via a handheld drill 502, however those skilled in the art would understand that various tools, such as a robotically manipulated drill, may be used to create the new tool hole 500.

Figure 6:
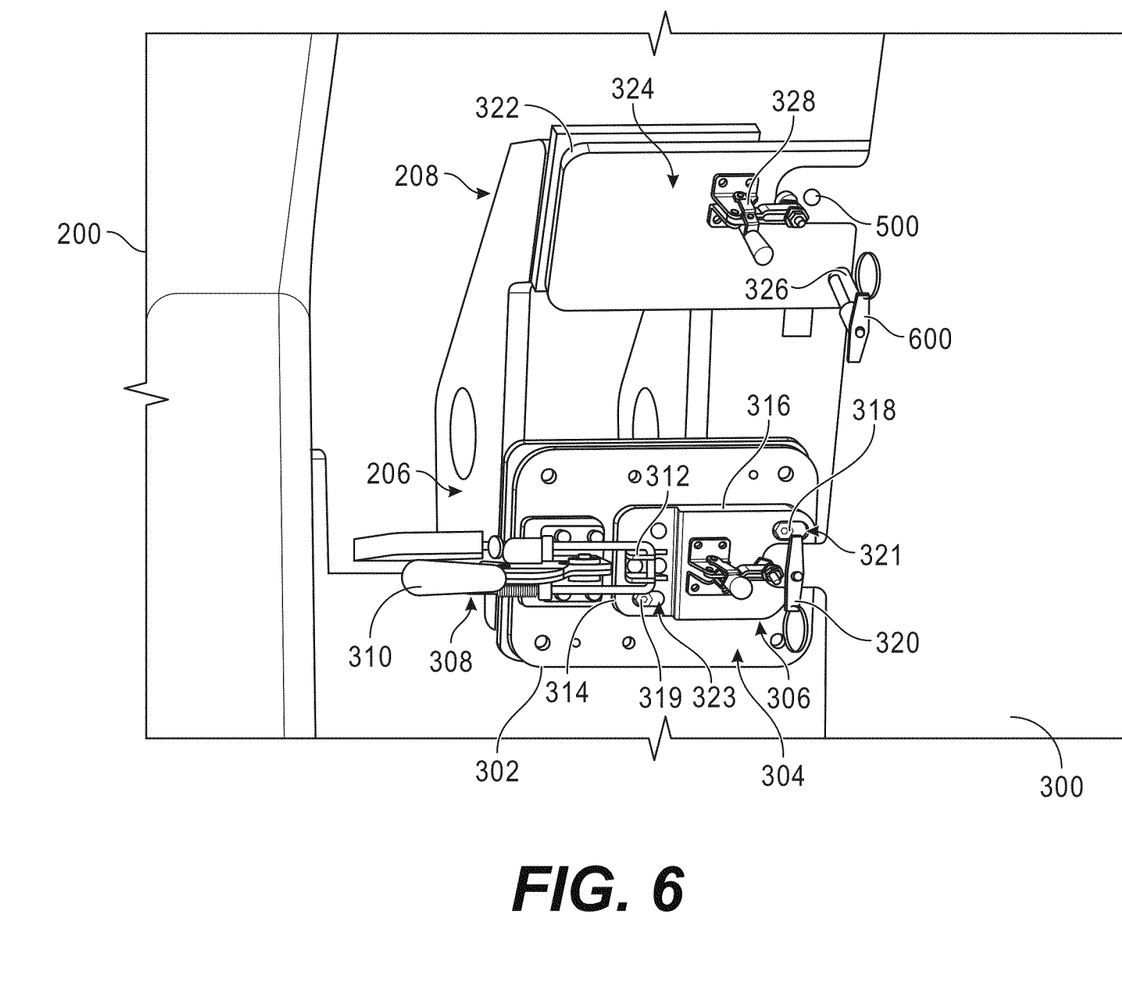
FIG. 6 is a front angled view showing insertion of a locator pin into the new tool hole of FIG. 5.

Now referring to FIG. 6, once the new tool hole 500 has been drilled, a pin 600 may be inserted through the hole 500 and into the tool body 322, thereby securing the skin thereto. After the pin 600 is inserted, further operations may be performed with the first aircraft skin 300. For example, the first aircraft skin may then be engaged with vacuum headers to pull the aircraft skin 300 into the correct shape. The new tool hole 500 being used in subsequent tools and assembly steps.

Figure 7:
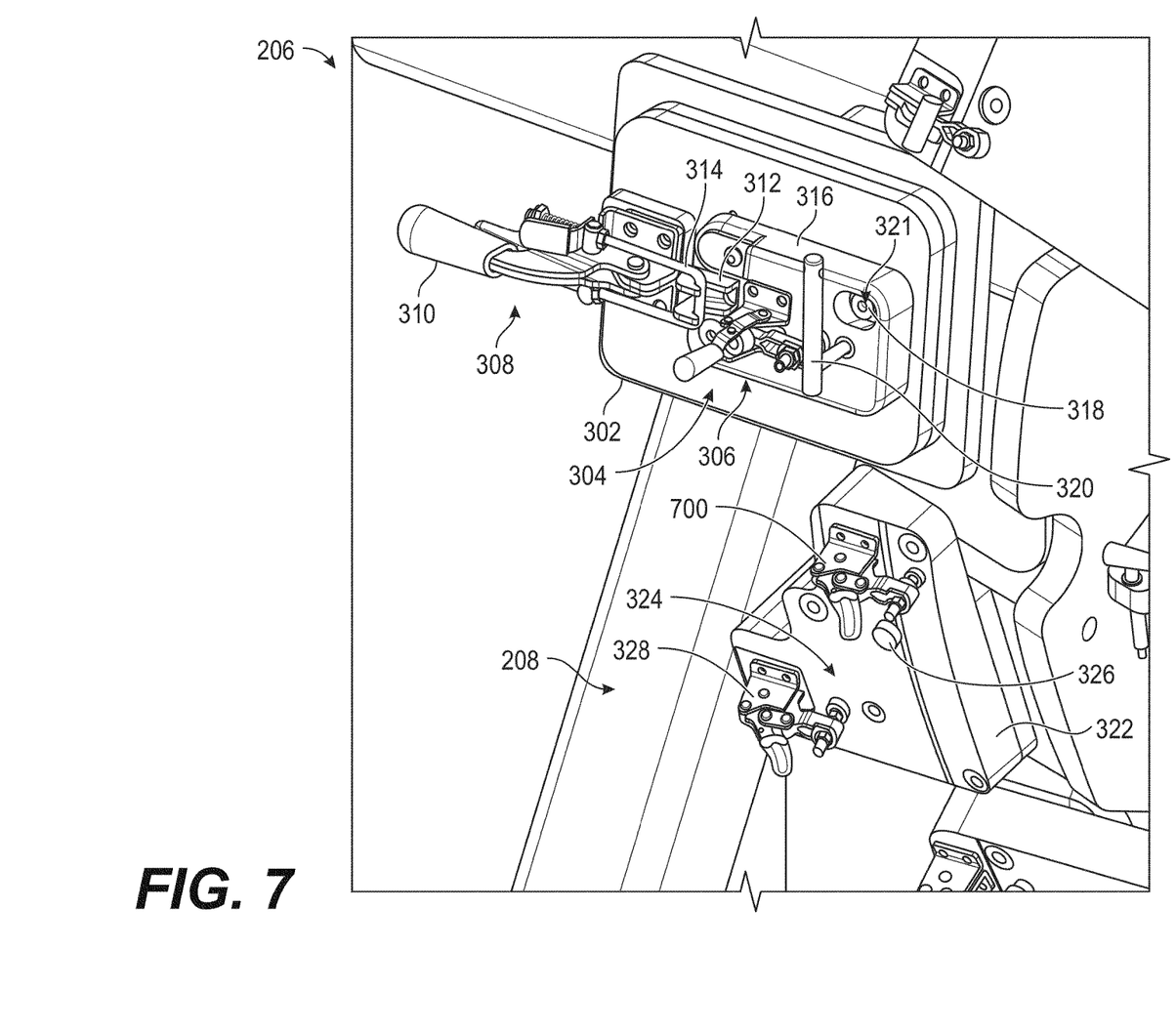
FIG. 7 is an angled perspective view showing a puller tool and a clamp tool of the aircraft skin alignment system as secured to the support structure, with no aircraft skin.

In FIG. 7, the puller tool 206 and the clamp tool 208 are shown without engagement with an aircraft skin for clarity. As would be understood by those skilled in the art, an overall assembly may utilize a plurality of each tool, and further, in embodiments, the puller tool 206 and clamp tool 208 may be combined into a single apparatus. Further, the vertical orientation may vary, for example, the puller tool 206 may be positioned below or above the clamp tool 208 as would be needed in various uses. As further shown, the clamp tool 208 may include one or more additional clamps 700.

Figure 8:
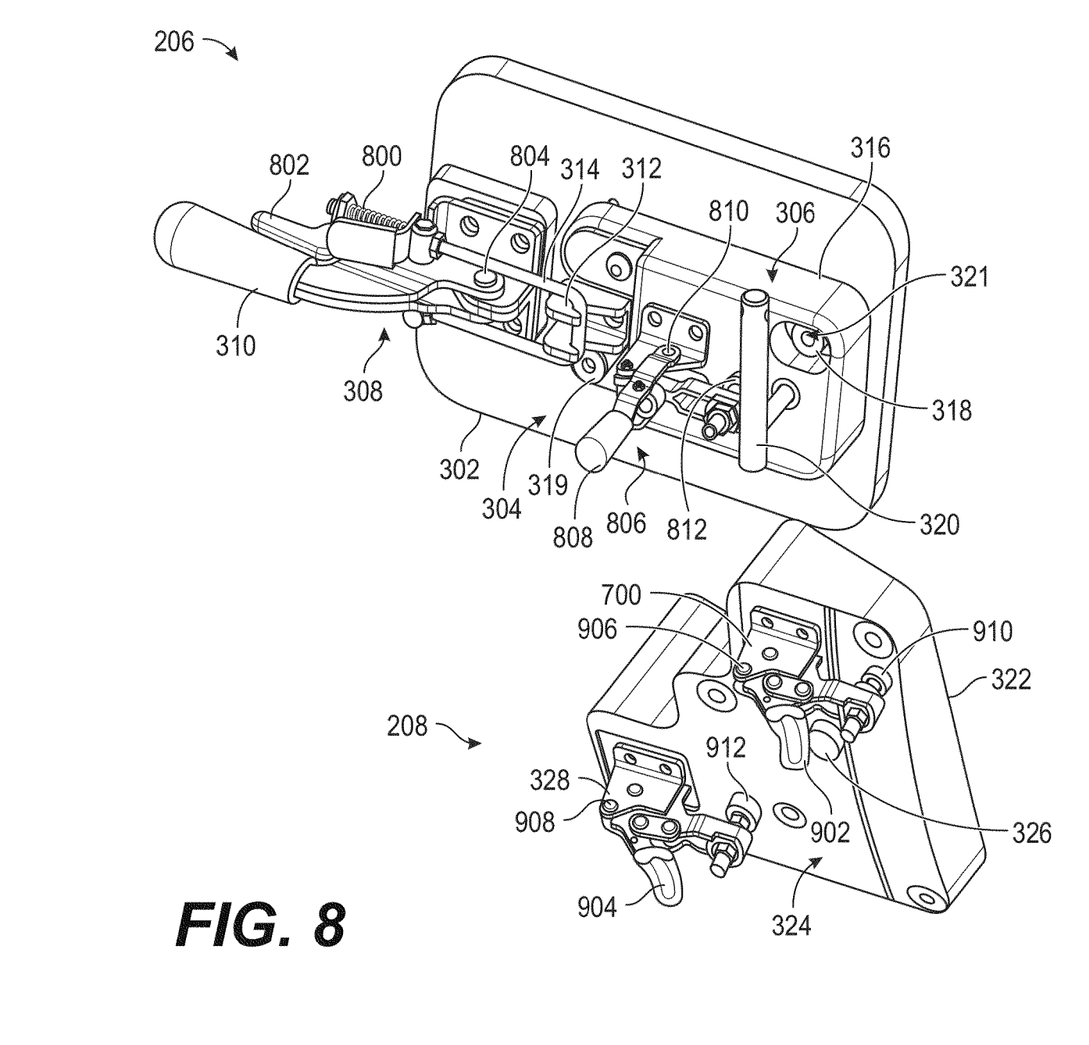
FIG. 8 is an angled perspective view showing the puller tool and the clamp tool of the aircraft skin alignment system.
Figure 9:
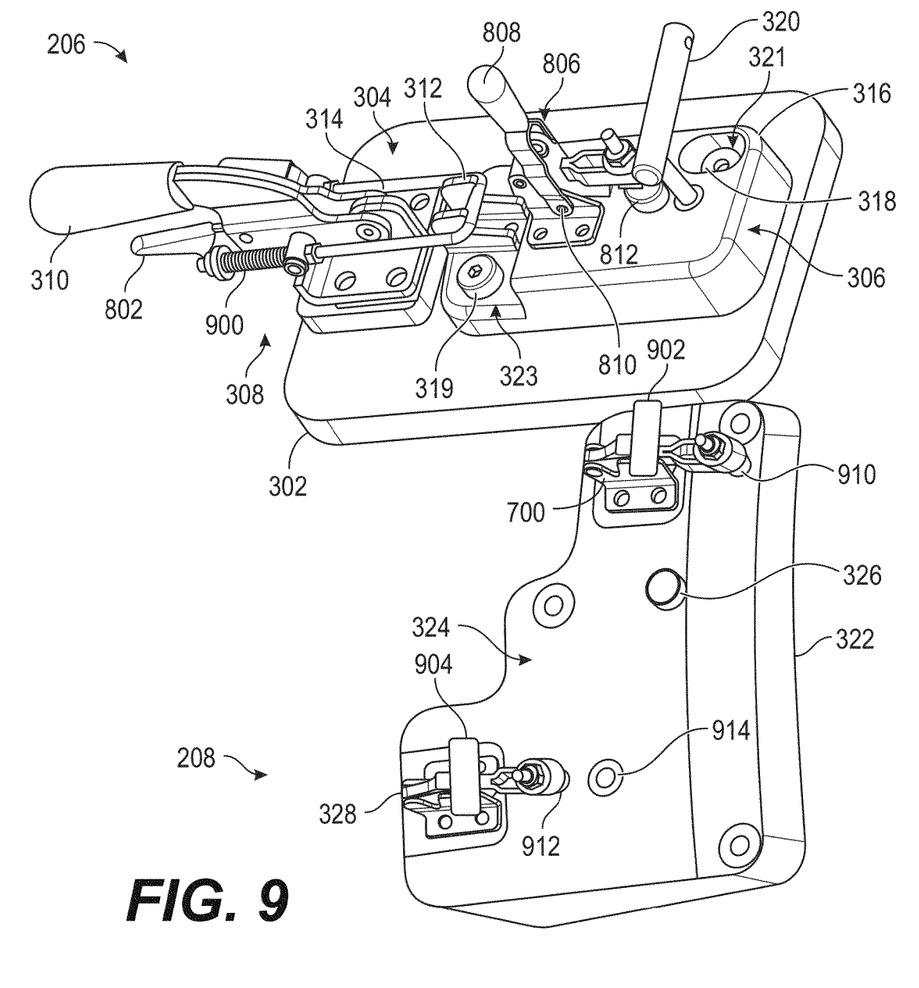
FIG. 9 is an angled perspective view showing the puller tool and the clamp tool of the aircraft skin alignment system.
Figure 10:
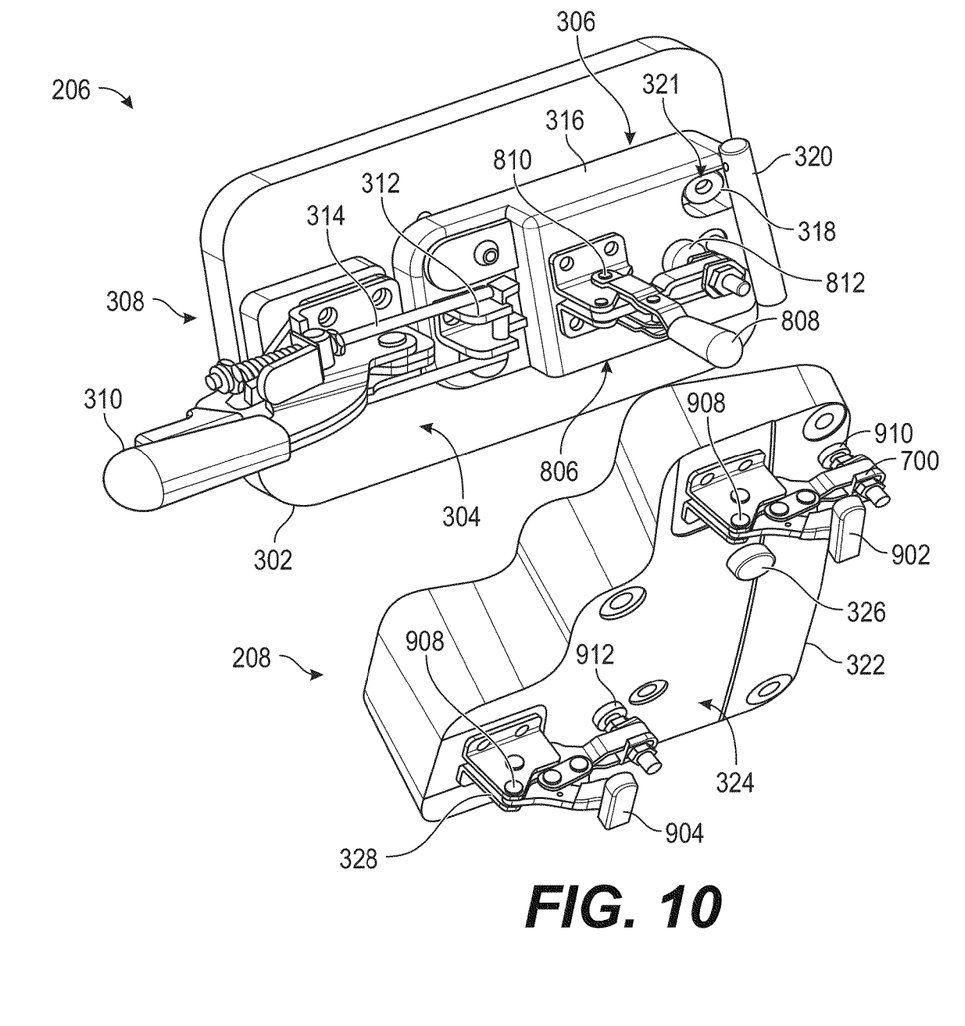
FIG. 10 is an angled perspective view showing the puller tool and the clamp tool of the aircraft skin alignment system.

FIGS. 8-10 show the puller tool 206 and clamp tool 208 disconnected from a support structure, showing additional features and details of each tool 206, 208. As shown, in embodiments, puller device 308 includes the spring-loaded handle 310 engaged with the latch 314 via one or more springs 800, 900 and a release 802. During use, the spring-loaded handle 310 will pivot via a pivot point 804 to extend the one or more springs 800, 900 and create force on hook 312. When force is no longer needed, the release 802 can be used to contract the one or more springs 800, 900 back to a relaxed position, thereby disengaging the latch 314 from the hook 312. As shown, in embodiments, the latch 314 may be substantially rectangular in shape, and the hook 312 may include two sides to create multiple points of contact with the latch 314.

In embodiments, puller tool 206 can further include a clamp 806 secured to the mount 316. The clamp 806 can vary as would be understood by those skilled in the art, the clamp 806 providing a means to further hold the aircraft skin in place. The clamp 806 may include a lever 808 with a pivot point 810 and an adjustable foot 812, wherein pivoting the lever 808 operates the foot 812 to create pressure below the foot 812, which can be applied to the aircraft skin. Alterative clamps may be used as would be understood by those skilled in the art.

As discussed, the clamp tool 208 can also include one or more clamps 328, 700 which may vary in configurations as would be understood by those skilled in the art. As an example, the one or more clamps 328, 700 may each include a lever 902, 904 with pivotal connections 906, 908 to actuate feet 910, 912 to create pressure applied to the aircraft skin.

As further shown, the clamp tool 208 may include one or more holes 914 for drilling the new tool hole, as discussed above.

One of the unique features believed characteristic of embodiments of the present disclosure is the edge locator 326. The use of an edge locator 326 allows for a user to index one or more aircraft skins based on the aircraft skin edges, which as a result, reduces the need to trim the edges during and/or after assembly. This functionality reduces labor of the aircraft assembly processes, can aid to reduce factory footprints, reduces tool expenses, and reduces worker exposer to potential injury. Although the edge locator 326 is shown having a round cross section, it is contemplated that alternative shapes and sizes may be utilized.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of aligning aircraft skin, comprising:
    loading a first aircraft skin onto a support structure;
    engaging a puller tool with the first aircraft skin;
    applying a pulling force to the first aircraft skin via the puller tool, wherein the applied pulling force pulls an edge of the first aircraft skin to an edge locator of a clamp tool; and
    drilling one or more tool holes through the first aircraft skin as the first edge abuts the edge locator;
    wherein the one or more tool holes are aligned based on an edge index due to a position of the edge locator.

2. The method of claim 1, further comprising inserting a pin through a tool hole and into the clamp tool to secure the first aircraft skin to the clamp tool.

3. The method of claim 1, wherein the edge locator comprises a protruding body extending from a tool body of the clamp tool, the protruding body creating a physical block to the first edge of the first aircraft skin.

4. The method of claim 1, wherein engaging the puller tool with the first aircraft skin further comprises inserting a locator pin through a tool hole of the first aircraft skin to secure the first aircraft skin to a mount, the mount configured to slide in a direction of the pulling force.

5. The method of claim 4, wherein applying the pulling force to the first aircraft skin further comprises:
    engaging a latch as part of a spring-loaded handle with a hook attached to the mount; and
    actuating the spring-loaded handle to apply the pulling force to the hook such that the pulling force is transferred to the mount and further to the first aircraft skin.

6. The method of claim 1, wherein drilling the one or more tool holes through the first aircraft skin as the first edge abuts the edge locator further comprises drilling from a back side of the clamp tool through a hole extending through a thickness of the clamp tool and into the first aircraft skin.

7. The method of claim 1, further comprising clamping the first aircraft skin to the clamp tool with one or more clamps as part of the clamp tool.

8. The method of claim 1, further comprising clamping the first aircraft skin to the puller tool with one or more clamps as part of the puller tool.

9. The method of claim 1, wherein the clamp tool and the puller tool are mounted to the support structure.

\* \* \* \* \*